(12) United States Patent
Aykin

(10) Patent No.: US 8,577,706 B1
(45) Date of Patent: Nov. 5, 2013

(54) METHOD FOR AGENT SCHEDULING FOR REVENUE AND SERVICE CHANNELS IN A SKILLS-BASED ROUTING ENVIRONMENT

(76) Inventor: Turgut Aykin, Atlantic Highlands, NJ (US)

( * ) Notice: Subject to any disclaimer, the term of this patent is extended or adjusted under 35 U.S.C. 154(b) by 79 days.

(21) Appl. No.: 13/068,274

(22) Filed: May 6, 2011

Related U.S. Application Data

(63) Continuation-in-part of application No. 12/584,210, filed on Sep. 2, 2009, which is a continuation-in-part of application No. 10/614,483, filed on Jul. 7, 2003, now Pat. No. 7,725,339.

(51) Int. Cl.
*G06Q 10/00* (2012.01)
*G06Q 10/06* (2012.01)

(52) U.S. Cl.
CPC .................... *G06Q 10/063* (2013.01)
USPC ....... 705/7.11; 705/7.12; 705/7.13; 705/7.14; 705/7.22

(58) Field of Classification Search
None
See application file for complete search history.

(56) References Cited

U.S. PATENT DOCUMENTS

| | | | | |
|---|---|---|---|---|
| 5,216,593 | A * | 6/1993 | Dietrich et al. | 345/467 |
| 6,002,863 | A * | 12/1999 | Sheer et al. | 703/22 |
| 6,044,355 | A * | 3/2000 | Crockett et al. | 705/7.39 |
| 6,192,122 | B1 * | 2/2001 | Flockhart et al. | 379/266.01 |
| 6,563,920 | B1 * | 5/2003 | Flockhart et al. | 379/265.1 |
| 6,581,027 | B1 * | 6/2003 | Sheer et al. | 703/9 |
| 6,622,134 | B1 * | 9/2003 | Sorkin | 706/20 |
| 6,744,877 | B1 * | 6/2004 | Edwards | 379/265.02 |
| 6,766,012 | B1 * | 7/2004 | Crossley | 379/265.02 |
| 6,831,966 | B1 * | 12/2004 | Tegan et al. | 379/88.16 |
| 6,856,680 | B2 * | 2/2005 | Mengshoel et al. | 379/265.06 |
| 6,970,829 | B1 * | 11/2005 | Leamon | 705/7.14 |
| 7,249,047 | B2 * | 7/2007 | Arguello et al. | 705/7.14 |
| 7,451,098 | B2 * | 11/2008 | Ingman et al. | 705/7.14 |
| 7,478,051 | B2 * | 1/2009 | Nourbakhsh et al. | 705/7.37 |
| 7,725,339 | B1 * | 5/2010 | Aykin | 705/7.14 |
| 2004/0054564 | A1 * | 3/2004 | Fonseca et al. | 705/7 |
| 2004/0111311 | A1 * | 6/2004 | Ingman et al. | 705/9 |
| 2006/0112049 | A1 * | 5/2006 | Mehrotra et al. | 706/46 |
| 2007/0121897 | A1 * | 5/2007 | Patakula et al. | 379/265.05 |
| 2007/0129996 | A1 * | 6/2007 | Babine et al. | 705/11 |
| 2010/0017241 | A1 * | 1/2010 | Lienhardt | 705/8 |

OTHER PUBLICATIONS

Cezik MT and L'Ecuyer P (2008). Staffing Multiskill Call Centers via Linear Programming and Simulation. Management Science Feb. 2008 54(2): 310-323.*

Bhulai S, Koole G, and Pot A (2008). Simple Methods for Shift Scheduling in Multiskill Call Centers. Manufacturing & Service Operations Management. Summer 10(3): 411-420.*

* cited by examiner

*Primary Examiner* — Brett Feeney

(57) ABSTRACT

The present invention provides a method for staffing and scheduling agents for revenue and service channels in a skills-based routing environment. Initially, the invention receives forecasts of number of contacts, average handling times, agent shrinkage and sales ratios for a planning period from a forecasting system. Next the initial required staffing levels for different skill groups are determined and agents are scheduled. In the iterative step, a skill group is selected and unscheduled while keeping agents in other skill groups on their current schedules, staffing levels for the skill group selected is updated using a staffing model that applies contact routing rules and includes the number of agents scheduled for work in other skill groups, and reschedules agents in the skill group selected. The invention continues iterations for each skill group until one or more stopping criteria are satisfied.

4 Claims, 3 Drawing Sheets

METHOD FOR AGENT SCHEDULING FOR REVENUE AND SERVICE CHANNELS IN A SKILLS-BASED ROUTING ENVIRONMENT

RELATED APPLICATION

This application is a continuation in part of and claims the benefit of priority of pending U.S. patent application Ser. No. 12/584,210 filed on Sep. 2, 2009, which was a continuation in part of U.S. patent application Ser. No. 10/614,483, filed Jul. 7, 2003, now U.S. Pat. No. 7,725,339, and U.S. patent application Ser. No. 13/066,774, which are fully incorporated by reference herein.

FIELD OF THE INVENTION

This invention relates generally to contact center planning and, more particularly, to methods and systems for agent scheduling for revenue and service channels at contact centers.

BACKGROUND OF THE INVENTION

With the advances in communication and internet technologies, direct marketing and sales channels became popular among customers. Among the sales channels companies currently using are contact centers, web sites, direct sales force, stores sales, etc. Some of these channels such as contact centers and web sites are different in nature than more traditional sales channels such as a sales force or in-store sales in that contact center and web based services usually accessible over extended periods of time.

Contact centers may also offer a plurality of services. For example, services offered may include general information, technical support, billing, and others.

At a contact center organization, contacts may be received through phone, chat, email, postal mail, etc. Contacts received via each channel are processed based on the needs of customers by contact center agents ("agent"). Each combination of revenue or service type offered and channel used is called a contact group ("contact group"). For example, billing-email, sales-phone, and support-chat may be some of the contact groups in a contact center organization.

A contact group used by customers to order products or services is referred to as a "revenue contact group", and a contact group used only for obtaining some type of service such as general information, technical help, etc. a "service contact group" in the remainder of this patent document.

Contact centers make forecasts of number of contacts offered ("NCO"), that is the number of contacts that customers are expected to attempt, and average service time its agents will need to serve a contact ("average handling time" or "AHT") for all contact groups they manage. These forecasts are used to develop agent schedules, staffing requirements, and performance projections.

Each contact group is assigned a performance target. For example, a service contact group (e.g. technical support via phone) may have a service level target ("SL") of answering x % of calls in y seconds. Another type of performance target for service contact groups specifies a maximum abandonment percentage ("Ab %") for customers who abandon or a maximum value acceptable for average speed of answer ("ASA") for contacts that are eventually served. These performance targets are together referred to as productivity-based targets ("productivity-based target"). Productivity-based performance targets are used for service contact groups.

Contact centers may be skills-based or non-skills based. In a non-skills based routing environment, each contact center agent is assigned to serve one contact group only. In a skills-based environment, an agent may have one or more skills to serve one or more contact groups. Contacts are routed to agents based on skills, availability and other routing preferences and rules. Agents may serve a plurality of contact groups depending on their skills and routing rules.

Agents with the same skills, proficiency, handling preferences and routing rules form a skill group ("skill group"). Thus, each agent is a member of a skill group with other agents sharing the same skills, proficiency, preferences, etc.

In a non-skills based environment, staffing models such as Erlang C or the Palm model (Palm, 1957) is used to determine the required staffing levels (also called "agent requirements") to deliver services at the performance target level. For this purpose, these models take the forecasted NCO, AHT and performance targets for each contact group and provide the required staffing levels to deliver services at the targeted performance level. Agents are then scheduled to meet the required staffing levels.

Agent schedules are generated by a variety of heuristics, and Mixed Integer Linear Programming methods. For example, U.S. Pat. No. 5,911,134 issued on Jun. 8, 1999 to Castonguay et al. describes a method for determining the required staffing levels using Erlang C and a heuristic method using a set of rules for scheduling agents in a non-skills based environment.

Likewise, U.S. Pat. No. 6,278,978 issued on Aug. 21, 2001 to Andre et al. describes a method that may be used to post-process an initial schedule set available from another source by applying a rule-based interchange procedure for scheduling agents in a non-skills based environment.

U.S. Pat. No. 6,044,355 issued on Mar. 28, 2000 to Crockett et al. describes a simulation method for developing agent schedules in a skills-based routing environment involving multiple agent groups, each with a plurality of skills, and a plurality of contact types requiring different agent skills. The method uses a heuristic scheduler and a simulator.

SUMMARY OF THE INVENTION

All revenue generating activities including direct, cross and up selling are referred to as sales in the remainder of this document.

Accordingly, in a first aspect of the present invention, a method for scheduling agents for revenue and service contact groups in a skills-based routing environment is disclosed.

The method comprises of the steps of 1) Receiving forecasts of NCO, AHT and sales ratios for a plurality of products, contact groups, and agents' unavailability for work as a percentage of scheduled work time ("shrinkage") for a plurality of agent groups, 2) determining, in the initialization step, staffing levels for all skill groups and scheduling agents belonging to them, 3) in each iteration, updating agent schedules in all skill groups by unscheduling agents one skill group at a time while keeping the agents in the other skill groups on their current schedules, simulating the contact arrivals, and rescheduling agents in the skill group, 4) continuing iterations in step (3) until a stopping rule is satisfied, and 5) repeating steps (1-4) periodically to receive updated forecasts of NCO and AHT, sales ratios and shrinkage, and adjusting agent schedules accordingly.

In another aspect of the present invention, we disclose a non-transitory computer readable medium and a computer program embodying a program of instructions executable to perform the method comprising the steps of: 1) Receiving forecasts of NCO, AHT and sales ratios for a plurality of products, contact groups, and forecasts of agents' unavailability as a percentage of scheduled work time ("shrinkage") for a plurality of agent groups, 2) determining, in the initialization step, staffing levels for all skill groups and scheduling agents belonging to them, 3) in each iteration, updating agent schedules in all skill groups by unscheduling agents one skill group at a time while keeping the agents in the other skill groups on their current schedules, simulating the contact arrivals, and rescheduling agents in the skill group, 4) continuing iterations in step (3) until a stopping rule is satisfied, and 5) repeating steps (1-4) periodically to receive updated forecasts of NCO and AHT, sales ratios and shrinkage, and adjusting agent schedules accordingly.

DETAILED DESCRIPTION OF THE PREFERRED EMBODIMENT

Figure 1:
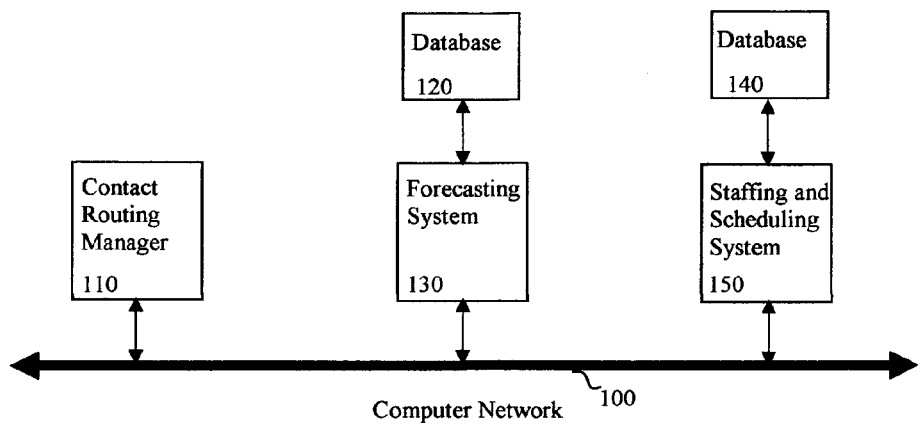
FIG. 1. shows a block diagram illustrating an example staffing and scheduling system according to an embodiment of the invention.

A method and system are described for agent scheduling for revenue and service contact groups in a skills-based routing environment.

Forecasts of NCO and AHT for each contact group are generated by a forecasting system for a planning period ("planning period") over which agents are to be scheduled. A planning period may consist of one or more weeks. In one embodiment, historical data may be stored in database 120 and forecasts may be provided by forecasting system 130.

In another embodiment, forecasts may be generated by experts or other sources using skills, data or background information including subjective assessment of conditions, and may directly be inputted into the system of the invention.

For forecasting and scheduling agents, days in the planning period are divided in to intervals. An interval ("interval") may be, for example, 15 or 30 minutes long. For each such interval in the planning period, NCO and AHT forecasts are generated and updated by the forecasting system.

The forecasting system may use historical data, and one or more of known time series forecasting methods that can model two or more seasonal patterns. U.S. patent application Ser. No. 11/446,711, for example, describes a system for forecasting NCO and AHT.

Besides NCO and AHT forecasts, forecasting system 130 may also generate shrinkage for each of a plurality of agent groups. A shrinkage forecast predicts the percentage of the scheduled agents who will not be available to work in an interval. Shrinkage may be caused by a plurality of reasons including sickness, taking time-off, training, meeting, relief or lunch breaks, personal needs, etc. Agent time for activities that result in agents not being available for work may be paid or unpaid.

In another embodiment of the invention, shrinkage forecasts may be based on an estimate and entered as inputs manually or read from other databases.

Let the set of all skill groups be SG with the skills of the agents in skill group i be $S_i$. Let n be the number of distinct skill groups, and $s_i$ be the number of skills in $S_i$. The following notation is used to describe the method of the invention.

h is the day index, h=1, . . . , 7, $T_h$ is the set of intervals during the scheduling period on day h, K is the number of contact groups, $\lambda_{kht}$ is the forecasted number of contacts or arrival rate (NCO) for contact group k in interval t on day h, k=1, . . . , K, and $t \in T_h$, $o_{kht}$ is the forecasted average service time (AHT) per contact for contact group k in interval t on day h, k=1, . . . , K, and $t \in T_h$, $\mu_{kht}$ is the service rate for contact group k in period t on day h, $\mu_{kht} = 1/o_{kht}$, k=1, . . . , K, and $t \in T_h$.

To facilitate the description of the method of the present invention, any variable or set defined with a subscript is shown as flat text when the variable or set itself is a subscript of another term. For instance, a set defined as $B1_{kih}$ is typed as $B1kih$ in $\Sigma_{t \in B1kih}$.

The method of the invention comprises of an initialization step and an iterative step including simulation and scheduling. The simulation and scheduling sub-steps are repeated in the iterative step as agent schedules are updated until a stopping rule is satisfied.

Initialization Step

The method of the invention starts the search for staffing levels and agent schedules by ordering the skill groups from the one with the maximum number of skills (i.e. $\max_{i \in SG} S_i$) to the least. Thus, each skill group $j \in SG$ has a rank R(j) with a value from 1, the highest ranking, to increasing rank values corresponding to the lower rankings. In case of a tie, the skill group with the smaller number of agents is ranked higher.

The method of the invention may start with the lowest ranked skill group or with the highest ranked skill group. When there are more agents than needed to meet all performance targets and minimize the total costs, the method of the invention starts with the lowest ranked skill group to reschedule, and proceeds to the highest ranked skill group, one skill group at a time. Otherwise, when available agents are not sufficient, the method of the invention starts with the highest ranked skill group to reschedule and proceeds to the lowest ranked skill group, one skill group at a time.

The order of scheduling skill groups is followed in both the initialization and iterative steps of the method of the invention. To facilitate the presentation of the method of the invention, it is described for the case in which it starts with the highest ranking skill group, i.e. R(j)=1.

To determine the initial staffing level for skill group j, the method and system of the invention considers the set of target contact groups $TG_j$. The set of target contact groups $TG_j$ for skill group j is determined by including: i) contact group for which skill group j has the highest skill level among its skills, and ii) all other contact groups served by this skill group only. In case of a tie (e.g. two skills both at level 1, the highest skill level) for the contact group with highest skill level, the contact group with the most workload is selected. Workload due to contact group k in interval t, $t \in T_h$, on day h is calculated as $w_{kht} = (\lambda_{kht}/\mu_{kht})$ or $w_{kht} = (\lambda_{kht} o_{kht})$.

Given the contact groups in $TG_j$, in one embodiment, the method of the invention uses a staffing model allowing customer abandonments (e.g. Palm, 1957) and a square root approximation to determine the starting staffing levels to meet the performance targets if the skill group considered alone serves the target contact groups.

Let $u_{kht}$ be the net staffing level needed to meet the performance target for contact group k in a non-skills based environment in interval t on day h.

Initial Staffing Levels for a Service Contact Group

For service contact groups, performance target may be selected as an SL, Ab % or ASA target. For staffing and agent scheduling for a revenue contact group, in one embodiment of the invention, a productivity-based target such as an SL, Ab % or ASA target may be selected. Determining the required staffing levels using a staffing model such as Erlang C or Palm model to meet this type of productivity-based targets is a common practice in contact centers. Using the same approach, initial staffing levels $u_{kht}$ are determined for each service contact group and interval t, tell, on day h, h=1, ..., 7.

To describe the method of the invention, all service contact groups are assumed to have SL targets specified. However, the method of the invention also applies to contact centers with service contact groups with other performance targets such as maximum Ab %, maximum ASA or maximum percent agent busy time ("occupancy") targets. Agent scheduling in environments with these types of performance targets together with revenue contact groups are also within the scope of the invention.

Initial Staffing Levels for a Revenue Contact Group

In the preferred embodiment, performance target for a revenue contact group is based on revenues ("revenue-based target") to the organization. To illustrate the method of the invention, it is described with a revenue-based target that aims at minimizing the total costs. It should be clear to the people with ordinary skills at art that the description of the method provided here can also be applied, in a straightforward manner, to other revenue-based targets such as to maximize net profits, maximize the number of units sold, etc. These and other revenue-based targets are also within the scope of the present invention.

When a customer abandons contact, the customer may or may not call back. When customer callbacks exist, percentage of such call backs may be estimated from the historical customer contact records. For example, telephone companies provide caller identification services. In another example, email addresses may be matched for repeated inquiries, or ip addresses for chat requests. This and other means may be used to estimate customer callback percentages. Customer callback percentages may vary by a plurality of factors including geography, time of day, week, month or year, product, models or features.

When a customer abandons contact and never contacts back regarding the product in question for a purchase in that particular instance, that contact is permanently abandoned. In the case of revenue contact groups, permanently abandoned contacts result in lost sales and profit. Customer callback rates are used in determining the permanently abandoned contact rates.

To minimize the total cost as the performance target, the method of the invention considers a number of related cost items in addition to the costs of permanently lost orders (that is, lost profits and goodwill). For example, these cost items include agent costs including wages and benefits paid, communication costs for the trunks available for customers, and facility costs due to such items as contact center hardware and software, building, taxes, heating/cooling, electricity and cleaning, etc.

Agent costs as well as facility costs increase as staffing level increases but abandoned calls decrease, lowering the cost of lost sales due to permanently lost orders.

Let contact group k in $TG_j$ be a revenue contact group. In one embodiment of the invention, agent costs for skill group j are calculated as the sum of wages per agent per interval ("$AW_j$"), benefits and bonuses paid per agent per interval ("$AB_j$"), facility costs per agent per interval ("$AF_j$") for this skill group. Agent costs also include the cost of assigning an agent to weekly work pattern (e.g. premium paid for weekend work or special patterns) per agent per interval ("$AWP_j$"). Agent costs for a staffing level of u to serve contact group k in an interval is obtained from the following formula.

$$f_{jk}(u) = u(AW_j + AB_j + AF_j + AWP_j) \quad (1)$$

The cost of lost sales is calculated as the profit not realized due to lost sales. Lost sales occur due to contact abandonments by customers contacting revenue contact group k. Customers who abandon their contacts or who are blocked (due to lack of an available trunk) may contact back. To obtain the number of contacts that are abandoned permanently by customers who had never been able to reach an agent, a permanently abandoned contacts measure ("$PAB\%_k$") as a percentage of abandoned contacts is obtained from the historical data on abandonments and contact id's (e.g. caller id, ip address, etc.) Thus, the number of permanently abandoned contacts is obtained by multiplying the number of abandoned contacts by the permanently abandoned contacts measure.

A sales ratio ("$SR_{kp}$") specifies the percentage of contacts received for revenue contact group k in an interval that would result in customer orders for product p. Using historical sales data, future plans and forecasts for factors that may affect product sales stored in database, sales ratios for a plurality of products and services offered by an organization are forecasted for each revenue contact group and each interval over the planning period.

Given the NCO and AHT forecasts for contact group k in an interval, expected contact abandonments % in the interval ("$CAB\%_k$") is computed for a staffing level u using a staffing model such as the Palm model. The staffing model used also provides the average wait time ("$AWT_k$") for all contacts. CAB % and AWT are used in calculating the total lost sales and communication costs.

Expected number of lost sales orders (in units) in an interval is then estimated by multiplying $NCO_k$ by the expected contact abandonments % in an interval $CAB\%_k$ and by the permanently abandoned contacts measure $PAC\%_k$, and by sales ratio forecast for each product or service sold $SR_{kp}$. The cost of lost sales is then determined by multiplying the average profit per lost sales unit ("$UP\$_p$") by the expected number of lost sales orders for each product or services sold.

In another embodiment, the cost of lost sales may also include the cost of lost goodwill due to low customer satisfaction resulting from not being able to communicate with an agent to order a product.

The lost sales cost for a revenue contact group and a product or service sold is determined by multiplying $NCO_k$ by $CAB\%_k$, $PAC\%_k$, $SR_{kp}$ for the contact group, and then by $UP\$_p$ for the product or service. The total lost sales costs for a staffing level of u in an interval is then computed as the sum over all products sold via revenue contact group k.

$$g_{jk}(u) = \sum_{All\ Products\ p} \{NCO_k (CAB\ \%_k)(PAC\ \%_k)(SR_{kp})(UP\$_p)\} \quad (2)$$

Communication costs are based on the total connection time. Connection time for a customer calling a contact center includes waiting time in the queue and, if answered before being abandoned, talk time with an agent. Talk time ("$TT_k$") may be different that $AHT_k$ in that $AHT_k$ may include before and after contact work times which may not require customers to stay connected to agents. Again, all costs are determined per interval. Like the lost sales costs, staffing models such as the Palm model or simulation provide the percent abandonments CAB %$_k$, the average wait time AWT$_k$ for all contacts, and ASA$_k$ for answered contacts to calculate these costs. Communication costs for a staffing level of u in an interval are computed as follows.

$$h_{jk}(u) = \{NCO_k \times (CAB\%_k) \times (AWT_k) + (ASA_k + TT_k) \times (NCH_k)\} CC\$_k \qquad (3)$$

Where NCH$_k$ is the number of contacts expected to be answered before being abandoned, and CC$\$_k$ is the communication cost per unit time.

Communication costs should also include callbacks together with average wait time and redial %.

Let u$_{kht}$ be the net staffing level for contact group k in interval t on day h. A net staffing level is calculated for skill group j for revenue contact group k it serves in every interval. Given $f_{jk}(u_{kht})$, $g_{jk}(u_{kht})$ and $h_{jk}(u_{kht})$ as the agent, lost sales, and communication cost functions, respectively, assuming non-skills based routing, the net staffing level for interval t on day h is given by the solution of the following formulation.

$$\text{Min Total Cost} = f_{jk}(u_{kht}) + g_{jk}(u_{kht}) + h_{jk}(u_{kht}) \qquad (4)$$

Subject to $$u_{kht} \geq 0. \qquad (5)$$

Figure 2:
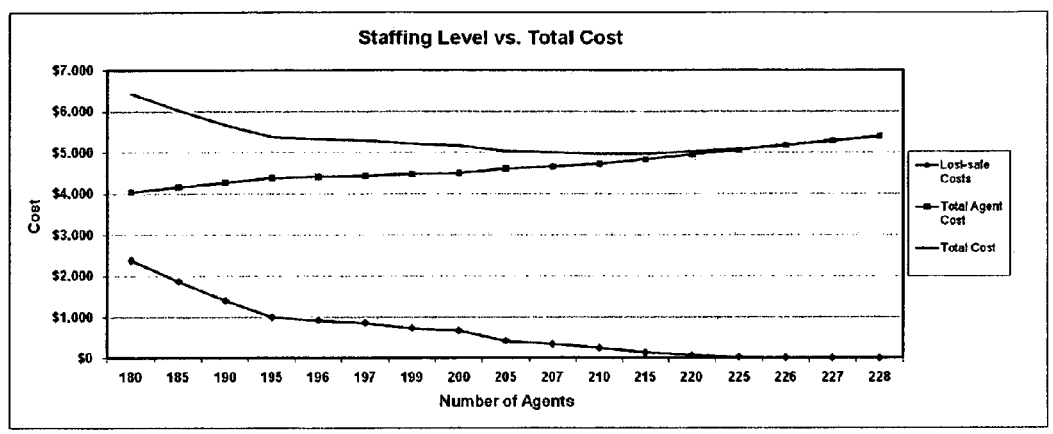
FIG. 2. shows a sample chart showing staffing level vs. total cost trade-off.

An example showing these costs elements is provided in FIG. 2. As shown in this example, the agent and facility costs increase while the total lost sales and communication decrease as the staffing level increases.

Given the NCO and AHT forecasts for contact group k in an interval, expected contact abandonments % CAB %$_k$ in the interval is computed for a staffing level u using a staffing model such as the Palm model. The staffing model used also provides the average wait time AWT$_k$, ASA$_k$, and NCH. CAB %$_k$, AWT$_k$, ASA$_k$, and NCH$_k$ are used in calculating the total lost sales and communication costs. Thus, the staffing level that minimizes (5) subject to (4) is determined by calculating the total costs for various staffing levels using CAB %$_k$, AWT$_k$, ASA$_k$, and NCH$_k$ predictions provided by the staffing model for each interval.

The marginal agent and facility cost at a staffing level is defined as the increase in the agent and facility costs for scheduling one additional agent. The marginal total lost sales and communication cost at a staffing level are defined as the decrease in the lost sales and communication costs expected from scheduling one more agent.

It is well know that, at the staffing level minimizing the total costs for revenue contact groups, the marginal agent and facility cost is equal or just exceeds the marginal total lost sales and communication cost, and when the staffing level is reduced by one agent, it is just the opposite.

The use of the Palm model as the staffing model in this step of the method is illustrative only. In other embodiments, simulation or other analytical methods such as regression may also be used to solve (4-5) and determine staffing levels u$_{kht}$. In yet another embodiment, staffing levels may also be based strictly on workload which is determined as NCO times AHT divided by the length of an interval.

Initial Staffing Levels for a Skill group

Given NCO and AHT forecasts, and performance targets for contact group k in TG$_j$, the method of the invention computes the required net staffing level u$_{kht}$ in each period t and day h. This is repeated for all contact groups in TG$_j$. An initial staffing level for skill group j for all contact groups in TG$_j$ in period t on day h is then calculated using the following approximation.

$$\pi_{jht} = \Sigma_{k \in TGj} w_{kht} + \{\Sigma_{k \in TGj}(u_{kht} - w_{kht})^2\}^{1/2} \qquad (6)$$

where $\pi_{jht}$ is the initial net staffing level for skill group j in interval t on day h. The staffing level calculated in (6) is an approximation for agent requirements for agents in skill group j for contact groups in TG$_j$. Initial net staffing levels for skill groups are refined by the method and system of the invention in the iterative step to meet the performance targets for all contact groups as described below.

The required staffing level for skill group j to schedule agents is computed with the forecasted shrinkage as follows.

$$b_{ht} = \pi_{jht}/(1 - \text{shrinkage}) \qquad (7)$$

Subscript for skill group j in b$_{ht}$ is dropped to simplify the notation in the remainder of this document.

It should be clear to those skilled in the art that the use of the square root approximation in (6) is illustrative only. In another embodiment, a simulator including all contact groups in TG$_j$ for skill group j or a regression model may be utilized to determined the initial staffing levels for each skill group. In yet another embodiment, an approximation method based on the estimated NCO and AHT for an aggregate service contact group combining all service contact groups in TG$_j$, and an aggregate revenue contact group combining all revenue contact groups in TG$_j$ may be used.

In order to schedule agents in the initialization step, the method and system of the invention formulates an MILP model for each skill group. The model and system of the invention generates an objective function, constraints and decision variables. Solution of the MILP model provides schedules for agents. The same MILP approach is also used for scheduling agents in the iterative step. The MILP model and solution method are described later in this document.

After scheduling agents in skill group j, the method and system of the invention then considers the skill group ranked next, and applies the same steps. That is, the set of target contact groups TG is identified, and agent requirements for these contact groups are determined using a staffing model. Initial staffing levels for the skill group are then obtained using (6) and adjusting them for shrinkage as in (7). With the initial staffing levels, an MILP model is formulated with an objective function, constraints and variables to satisfy all scheduling rules and agent availabilities in this skill group. It then applies a solution method to the MILP model to obtain a solution. This process is continued until all skill groups are scheduled.

When all skill groups are considered and scheduled in the initialization step, the method of the invention starts the iterative step.

Iterative Step

The iterative step of the method and system of the invention consists of two sub-steps that are repeated for each skill group once. Each completion of the iterative step for all skill groups is called an "iteration". These sub-steps are i) simulation to update agent requirements, and ii) re-scheduling. In each iteration, all skill groups are rescheduled, one at a time, to generate new schedules. For this purpose, the method of the invention first considers the skill group with the highest ranking R(j)=1. All agents in this group are unscheduled by discarding their schedules found in the previous iteration (or the initialization step if this is the first iteration) while agents in all other skill groups are treated as scheduled and working their current schedules. For each skill group i other than j, AOD counts are calculated for each interval from the current agent schedules. Let AOD$_{iht}$ be the number of agents from skill group i who are scheduled to be on duty (that is, at work and not taking a break) serving customers in interval t on day h. AOD$_{iht}$ is adjusted for forecasted shrinkage. Thus, AOD$_{iht}$ is the number of agents working in interval t on day h after agents expected to be absent due to shrinkage are subtracted. Given $AOD_{iht}$ for all skill groups except skill group j, the method and system of the invention simulates contact center environment in the simulation sub-step via a discrete event simulator.

Discrete Event Simulator

The simulator of the method and system of the invention uses discrete event simulation (Law et al., 2000). In searching for agent requirements for skill group j, the simulator starts with an initial staffing level for an interval and adjusts it in an iterative manner using a sub-gradient search algorithm until a staffing level with simulated performance meeting performance targets for all contact groups that are affected by this skill group are found. In this sub-step, not only the contact groups served by skill group j (that is, with skills in $S_i$) but also the contact groups not directly served but affected by this skill group's staffing levels are also considered. Agents scheduled for skill group j would affect other contact groups not served directly by its agents if there are other skill groups that serve both these contact groups and one or more contact groups served by skill group j. Let the set of all such contact groups be CG.

Given agents-on-duty counts, $AOD_{iht}$ for i≠j, the simulator of the method and system of the invention includes all contact groups and simulates contact arrivals and handling according to NCO and AHT forecasts starting with the first interval in the planning period. Each interval is simulated, one at a time, until the required staffing level is found. Once the updated staffing level is determined for an interval, the simulators begins simulating the next interval as described below.

In simulating contact arrival and handling, contact routing rules (e.g. longest idle agent, longest waiting call, highest skill level) are applied as specified for the contact center environment. The simulator also simulates contact abandonments based on the observed customer tendency to abandon (impatience) using the actual percentage abandoned and waiting time calculated from the historical data for each contact group.

Specific instances of interarrival times between successive arrivals of contacts from a contact group according to the forecasted NCO, handling times from forecasted AHT, and customer abandonment thresholds for these contacts are generated randomly according to their probability distributions (e.g. Poisson, exponential, lognormal). To generate these times, as customary in the field simulation, the simulator uses a random number generator and their probability distributions. The random number generator provides a series of random numbers starting with an initial value ("seed"). When different seeds are used, the random number generator provides different sequences of random numbers.

Because of the scheduled agents in the other skill groups, it is possible that the method used for determining the initial staffing level, $\pi_{jht}$, may overestimate the required staffing level in an interval. When this happens, after the simulation with the initial staffing level, the method of the invention lowers the agent requirements until a staffing level is found with at least one service contact group with service level less than its target or the marginal total lost sales and communication cost is greater than the marginal agent and facility cost before starting the search for the agent requirement for skill group j.

Each interval and staffing level is simulated a number of times using different seeds to collect performance statistics. Each such simulation of an interval and staffing level with a distinct seed is called a replication ("replication").

After completing the desired number of replications, performance statistics are calculated for each one. Calculated performance statistics include the service level for service contact groups, the total costs for revenue contact groups, CAB %, AWT, ASA, and agent occupancy. Other statistics such as the number of contacts answered NCH, abandoned, and waiting are also calculated. To obtain an estimate of the performance, an average and standard deviation for each performance statistic in all replications completed are calculated.

Let contact group k be a service contact group. Suppose the performance target for contact group k is specified as an SL target. The method of the invention is also applicable when an maximum Ab %, ASA, or other productivity-based target is selected for a contact group. Let the service level observed for contact group k in interval t on day h with $\pi_{jht}$ agents in skill group j and $AOD_{iht}$ agents in other skill groups, i∈SG and i≠j, be $SL_k(\pi_{jht})$. Moreover, let the marginal total lost sales and communication cost in interval t on day h with $\pi_{jht}$ agents in skill group j and $AOD_{iht}$ agents in other skill groups, i∈SG and i≠j, be $RV_j(\pi_{jht})$, and let the marginal agent and facility cost be $AG_j(\pi_{jht})$.

If i) the performance target for every service contact group in $CG_j$ is met or exceeded, and ii) the marginal total lost sales and communication cost for all revenue contact groups evaluated at the current staffing level simulated is less than or equal to the marginal agent and facility cost for skill group j, simulation of the interval is completed unless it is determined that the staffing level is overestimated the required level. When the last increase in the staffing level is more than one unit, the last staffing level is tested for overstaffing by lowering the staffing level, in an iterative manner, by one unit at a time to determine if the service level targets are still satisfied for the service contact groups in $CG_j$, and the marginal total lost sales and communication cost is still less than or equal to the marginal agent and facility cost for the skill group. The reduction in the staffing level continues until at least one of conditions (i) or (ii) above is violated. When there is no overstaffing in the staffing level found while satisfying (i) and (ii) above for skill group j in interval t on day h, the simulator begins the analysis of the next interval (t+1) in the same manner.

When the performance targets for one or more service contact groups in $CG_j$ are not met or when the marginal total lost sales and communication cost is greater than the marginal agent and facility cost, the required staffing level in the interval simulated is increased.

Let the set of service contact groups whose service level targets are not met at the current staffing level, $\pi_{jht}$, be $U_j$. The method of the invention next determines sub-gradients by increasing the staffing level for skill group j to $\{\pi_{jht}+a\}$ where a>1. This new staffing level and the previous one are used to determine a sub-gradient for each contact group in $U_j$.

Figure 3:
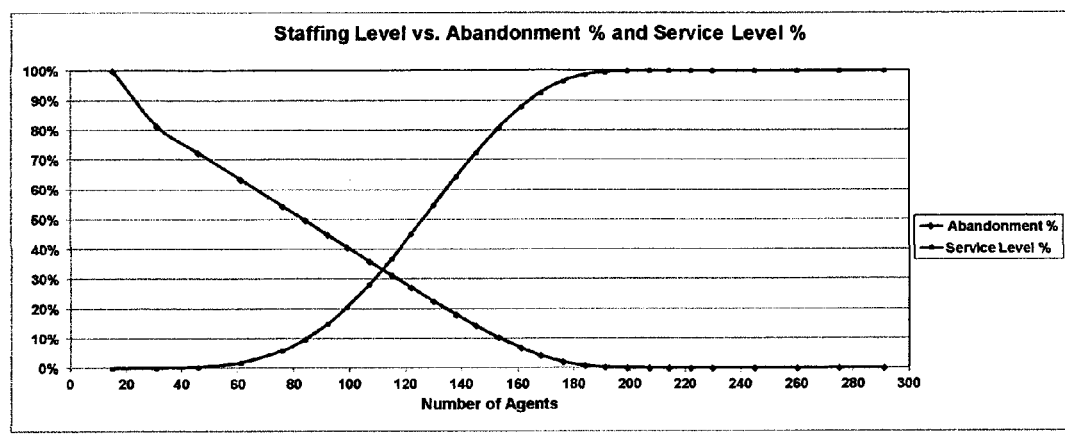
FIG. 3. shows the service level and abandonment % curves for a contact group.

It is known that the service level for a contact group increases following an S-shaped curve with the staffing level. FIG. 3. shows a service level curve. For low staffing levels, service level is a convex function. It becomes a concave function beyond a certain level. Setting the initial staffing level using the method of the invention attempts avoid the convex part of the service level function.

The method of invention repeats the simulation step with $\{\pi_{jht}+a\}$ as the staffing level for skill group j. Sub-gradients of contact groups in $U_j$ are then calculated as $$G_k(\pi_{jht}) = \{[SL_k(\pi_{jht}+a) - SL_k(\pi_{jht})]/a\}, k \in U_j. \tag{8}$$

Likewise, when the marginal total lost sales and communication cost is greater than the marginal agent and facility cost for skill group j, that is $RV_j(\pi_{jht}) > AG_j(\pi_{jht})$, the method of the invention determines a sub-gradient by increasing the staffing level for skill group j in interval t to $\{\pi_{jht}+a\}$ where a>1.

Abandonment % for a contact group is a convex, decreasing function of the staffing level. FIG. 3. shows an abandonment % curve. For the marginal total lost sales and communication cost for revenue contact groups, the marginal agent and facility cost provides a lower bound as the target to meet. As the staffing level increases, the marginal total lost sales and communication cost, the decrease expected in the total lost sales and communication costs from one additional agent, decreases while the cost of one additional agent, that is the marginal agent and facility cost, remains leveled.

Sub-gradient for all revenue contact groups is calculated as follows.

$$H_j(\pi_{jht}) = \{[RV_j(\pi_{jht}) - RV_j(\pi_{jht}+a)]/a\} \quad (9)$$

In (9), $\{[RV_j(\pi_{jht}) - RV_j(\pi_{jht}+a)]/a\}$ provides the rate of decrease in the marginal total lost sales and communication cost per unit increase in $\pi_{jht}$ The total as well as marginal lost sales and communication costs for a skill group include costs for all revenue contact groups affected by changes in the staffing level of the skill group.

The sub-gradient for skill group j is calculated as follows.

$$SG_{jht}(\pi_{jht}) = \max\{\max_{k \in U_j}\{\|[v_{kht} - SL_k(\pi_{jht})]/G_k(\pi_{jht})\|, \|RV_j(\pi_{jht}) - AG_j(\pi_{jht})\|/H_j(\pi_{jht})\|\} \quad (10)$$

where $\|\cdot\|$ is a function that returns the smallest integer greater than or equal to the argument.

If $SG_{jht}(\pi_{jht})$ is greater than zero, the staffing level for skill group is increased to $\pi_{jht} = \pi_{jht} + SG_{jht}(\pi_{jht})$, and simulation is repeated for interval t with the new staffing level.

If $SG_{jht}(\pi_{jht})$ is negative or zero, increasing staffing level $\pi_{jht}$ for skill group j in interval t on day h further may not improve service levels or reduce total costs in this interval. However, it is possible that service levels for contact groups in $U_j$ or total costs may not improve for a small increase in the staffing level due to the nature of discrete event simulation. In this case, the method and system of the invention increases the staffing level further and repeats simulation with the new increased staffing level. if, with the further increased staffing level, $SG_{jht}(\pi_{jht})$ is still not greater than zero, increasing staffing level for this skill group would not improve performance or total costs.

The method and system of the invention checks the amount of last increase in staffing level $\pi_{jht}$ before terminating the search for this interval to prevent overstaffing. If the last increase in the staffing level was greater than one, it is reduced by one unit to determine if the reduced staffing level would cause i) a service level lower than the SL target for at least one service contact group in $CG_j$ whose SL target was met or exceeded, or ii) marginal total lost sales and communication cost exceeding the marginal agent and facility cost. If it does, the last staffing level is restored and the search for the staffing level for skill group j in interval t on day h is terminated. If the reduced staffing level does not result in violation of either (i) or (ii) above, then it is further reduced until service levels for one or more contact groups in $CG_j$ are lower than their SL targets or marginal total lost sales and communication cost exceeds the marginal agent and facility cost. When this happens, the staffing level before the last reduction is restored and the search for the staffing level for skill group j in this interval is terminated.

When the simulator of the method and system of the invention completes the analysis of all intervals in $T_h$ on all days, h=1, . . . , 7, the required staffing levels including shrinkage $b_{jht}$ are calculated from $\pi_{jht}$ using (7).

The method of the invention next initiates the re-scheduling sub-step to generate the MILP model. The MILP model requires staffing levels generated by the simulator, and all scheduling rules stored in the database of the system of the invention. The model is then generated to solve for agent schedules. Upon generation of solution of the model, optimized agent schedules and agents-on-duty counts $AOD_{jht}$ are determined, $t \in T_h$, h=1, . . . , 7.

Each time when an iteration of the method of the invention is completed, schedules for agents in all skill groups are updated. To update the service levels and total costs expected with the newly updated schedules, the simulator is run one more time with the updated $AOD_{jht}$ values for all skill groups at the end of each iteration. This is called the "performance evaluation" pass. The performance evaluation pass completes an iteration with the updated agent schedules, service levels and total costs.

Service levels for all service contact groups and the total costs in successive iterations are compared, and the method of the invention terminates the iterative step with the final schedules ("final schedules") if one or more stopping rules are satisfied. The method of the invention stops, for example, when i) the largest difference in service levels for service contact groups, and the total costs for all skill groups in the two successive iterations is less than a small value (e.g. 1%), ii) maximum number of iterations specified is exceeded, or iii) total time allowed for iterations is exceeded.

As described before, the simulator makes several replications to refine service level estimates for each interval. The method and system of the invention uses a variance reduction technique known as the Common Random Numbers technique (Law et al., 2000) in the simulator.

It should be clear to a person with ordinary skills in the art that the simulation sub-step can be modified in a number of ways. For example, the simulation can be carried out with other variance reduction techniques (Law et al., 2000) or no variance reduction technique. Moreover, service contact groups may have Ab %, ASA or other performance targets. The simulation and sub-gradient search steps of the method and system of the invention can be applied using performance targets other than SL targets for service contact groups. These variations of the method and system of the invention are also within the scope of the present invention.

MILP Model for Scheduling Agents in a Skill Group

Agents are scheduled to weekly schedule patterns referred to as tours. To describe the MILP model, it is assumed that a tour specifies a weekly work pattern that is seven days long with the following breaks in the work schedule: (i) Daily breaks in the shift schedule including two relief breaks, and one lunch break during a work day, and (ii) two non-work days (i.e. days-off). To simplify the notation used to describe the MILP model, it is further assumed that each relief break is one planning period, and lunch break two planning periods long. Extensions of the MILP model of the method to tours with more or less breaks, and with different break durations together with various other scheduling rules are disclosed in U.S. patent application Ser. No. 12/584,210, and U.S. Pat. No. 7,725,339.

Agents assigned to a tour may or may not have the identical daily shift start times and shift lengths on different days during a week. A skill group may include one or more tour types. In the general case, different tour types may also have different number of consecutive or non-consecutive off days, number of daily breaks and break durations, etc.

In one embodiment, agent scheduling rules and requirements for a skill group can be formulated as an MILP model as follows.

Minimize $\Sigma_{l\in QLk}\Sigma_{k\in QK}\alpha_k C_{kl}Q_{kl}+\Sigma_{k\in QK}\Sigma_{n\in Fk}\Sigma_h\Sigma_{i\in QIk}\alpha_k c_{knhi}QX_{knhi}+\Sigma_{t\in Th}\Sigma_h\Sigma_{0\leq j\leq bht}\Delta_{jht}Y_{jht}$ (11)

Subject to $\Sigma_{k\in QK}\Sigma_{n\in Fk}\Sigma_{i\in QIk}a_{kniht}QX_{knhi}-$
$\Sigma_{k\in QK}\Sigma_{n\in Fk}\Sigma_{i\in QT1kniht}QU_{kniht}-$
$\Sigma_{k\in QK}\Sigma_{n\in Fk}\Sigma_{i\in QT2kniht}(QW_{kniht}+QW_{knih(t-1)})-$
$\Sigma_{k\in QK}\Sigma_{n\in Fk}\Sigma_{i\in QT3kniht}QV_{kniht}+\Sigma_{0\leq j\leq bht}jY_{jht}-$
$O_{ht}=b_{ht}, t\in T_h, h=1,\ldots,7,$ (12)

$QX_{knhi}=\Sigma_{t\in QB1knih}QU_{knihv}, n\in F_k, i\in QI_k, k\in QK, h=1,\ldots,7,$ (13)

$QX_{knhi}=\Sigma_{t\in QB2knih}QW_{knihv}, n\in Fk, i\in QI_k, k\in QK, h=1,\ldots,7,$ (14)

$QX_{knhi}=\Sigma_{t\in QB3knih}QV_{knihv}, n\in Fk, i\in QI_k, k\in QK, h=1,\ldots,7,$ (15)

$\Sigma_{l\in QLk}A_{klh}Q_{kl}=\Sigma_{n\in Fk}\Sigma_{i\in QIk}QX_{knhi}, k\in QK, h=1,\ldots,7,$ (16)

$\Sigma_{l\in QLk}Q_{kl}<QD_k^{max}, k\in QK,$ (17)

$\Sigma_{0\leq j\leq bht}Y_{jht}=1, t\in T_h, h=1,\ldots,7,$ (18)

$QK_{knhi}, Q_{kl}, QU_{kniht}, QW_{kniht},$ and $QV_{kniht}>0$ and integer for all $k,n,i,h,t, Y_{jht}\in[0,1]$ and integer, and $O_{ht}>0$ for all $h$, and $t$, (19)

where
$F_k$ is the set of shift lengths specified for tour k;
$T_h$ is the set of all intervals in day h;
$OI_k$ is the set of daily start times for tour k;
QK is the set of all possible tours including both requiring and not requiring consistent daily start times for scheduling agents. When a tour requires consistent daily start times, a pseudo tour is defined for each start time of the tour with the same tour, shift, break, and work and non-work rules, and included in $QI_k$ and QK;
$QL_k$ is the set of all allowed work day patterns for the agents assigned to tour k. Only the work patterns satisfying the work and non-work day rules such as minimum and maximum consecutive of days, work days, weekend days off, etc. specified for tour k are included in $QL_k$;
$QB1_{knih}$ is the set of intervals on day h during which an agent assigned to tour k and shift length n with daily start time i may start his/her first relief break and complete within the time window specified for this tour group, shift length, start time, and day;
$QB2_{knih}$ is the set of intervals on day h during which an agent assigned to tour k and shift length n with daily start time i may start his/her lunch break and complete within the time window specified for this tour group, shift length, start time, and day;
$QB3_{knih}$ is the set of intervals on day h during which an agent assigned to tour k and shift length n with daily start time i may start his/her second relief break and complete within the time window specified for this tour group, shift length, start time, and day;
$QT1_{kniht}$ is the set of daily start times for shift length n for tour k for which interval t on day h is a first relief break start interval;
$QT2_{kniht}$ is the set of daily start times for shift length n for tour k for which interval t on day h is a lunch break start interval;
$QT3_{kniht}$ is the set of daily start times for shift length n for tour k for which interval t on day h is a second relief break start interval;

$a_{kniht}$ is equal to one when interval t on day h is in the shift span (that is, a work or a break interval) of agents assigned to tour k who have a daily start time of i and shift length n on day h, and zero otherwise;
$A_{klh}$ is equal to one when day h is a work day for agents assigned to tour k and work pattern l, and zero otherwise;
$C_{kl}$ is the weekly cost of assigning an agent to tour k with work pattern of l;
$c_{knhi}$ is the facility costs, and daily wages and benefits paid to agents assigned to tour k with a daily shift length of n and start time of i on day h;
$\alpha_k$ is the percentage of weekly agent costs, and wages and benefits paid to agents working tour k based on the paid activities portion of shrinkage and actual work time;
$b_{ht}$ is the required staffing level in interval t on day h;
$\Delta_{jht}$ is lost sales and communication costs plus penalty costs if service levels for one or more service contact groups are below their service level targets when the number of agents scheduled in interval t on day h is j agents less (shortage) than the agents required in this interval $b_{ht}$;
$QD_k^{max}$ is the maximum number of agents available to assign to tour k;
where decision variables whose values are determined by a solution to the MILP model are defined as:
shift variables:
$QX_{knhi}$ is the number of agents assigned to tour k and shift length n with a daily starting time of i on day h;
break variables:
$QU_{kniht}$ is the number of agents assigned to tour k and shift length n with a daily start time of i and starting their first relief breaks in interval t on day h;
$QW_{kniht}$ is the number of agents assigned to tour k and shift length n with a daily start time of i and starting their lunch breaks in interval t on day h. When a tour has more than one lunch break to be scheduled during a shift, then a set of break variables and constraints are defined for each lunch break type in the same manner with $QW_{kniht}$ variables and constraints (14). A lunch break variable may be two or more intervals long. A lunch break variable will appear in all intervals on the left right side of (12) with a negative sign during which the agents assigned to the associate break start time will be on break;
$QV_{kniht}$ is the number of agents assigned to tour k and shift length n with a daily start time of i and starting their second relief breaks in interval t on day h. When a tour has more than two relief breaks to be scheduled during a shift, then a set of break variables and constraints are defined for each break type in the same manner with $QU_{kniht}$ and $QV_{kniht}$ variables and constraints (13) and (15), and included (12). A relief break variable may be one or more intervals long. A relief break variable will appear in all intervals on the left right side of (12) with a negative sign during which the agents assigned to that break start time will be on break;
work pattern variables:
$Q_{kl}$ is the number of agents assigned to tour k with a work pattern of l;
shortage variables:
$Y_{jht}$ is equal to one if the left side of (12) is j agents less than $b_{ht}$ (that is a shortage of j agents) in interval t on day h, and zero otherwise;
excess variables:
$O_{ht}$ is the total overstaffing on the left hand side of constraint (12) in excess of the required staffing level, $b_{ht}$, in interval t on day h;
In the MILP formulation (11-19), objective function (11) is the total costs including weekly agent costs in the first term, agent wages, benefits and facility costs in the second term, and lost sales and communication costs in the third term. Constraint (12) ensures that the total number of agents assigned to various tours and available in interval t on day h (first term on the left side of (12)) plus agent shortage (second term on the left side of (12)) minus agent overages is equal to the required staffing level $b_{ht}$ in all intervals and days. Break constraints (13-15) ensure that one first relief, one lunch, and one second relief break are scheduled for each agent who is assigned to tour k with a daily start time of i and length n, and working on day h. Thus, the number of first relief, lunch, and second relief breaks scheduled for tour k with a daily start time of i on a given day is equal to the number of agents assigned to this tour and working on that day. Constraint (16) ensures that agents are scheduled to work patterns and will have sufficient number of shifts on each day the work pattern specifies work. Constraint (17) ensures that the total number of agents assigned to tour type k doesn't exceed the maximum number of agents that are available to assign to this tour type. This constraint can easily be modified to limit the number of agents that can be assigned to a set of tour types (e.g. full time 40-hour/week tours may include 8-hour shifts and 5 work days a week, and 10-hour shifts and 4 work days a week). Constraint (18) specifies that, when staffing shortages in (12) occurs in interval t on day h for j agents, $Y_{jht}$ will be set equal to one while all other $Y_{lht}$, l≠j, set equal to zero to correctly include the associated costs $\Delta_{jht}$ in the objective function (11). Finally, constraint (19) restricts $QX_{knhi}$, $Q_{kl}$, $QU_{kniht}$, $QW_{kniht}$, and $QV_{kniht}$, and $G_{ht}$, $S_{ht}$ and $O_{ht}$ to nonnegative integers, and $Y_{jht}$ ∈ [0,1] and integer.

In a skills-based routing environment, a trade-off between services for service contact groups and the total costs may exist. When the MILP formulation (11-19) is solved without penalties for poor service levels (below the targeted performance levels) for service contact groups, agents may be scheduled to periods with emphasis on the total costs only. This may lower the total costs at the expense of poor service levels for the service contact groups. To address this trade-off the method of the invention adds a penalty cost to $\Delta_{jht}$ when agent shortages for a skill group lower service levels below their targets for the service contact groups served or affected by its staffing level in $CG_j$. Thus, the objective function (11) does not put emphasis on the reduction of the total costs alone. Penalty costs ("penalty costs") vary with the number of service contact groups with service levels lower than their targets, level of service level deterioration for each contact group, and other factors.

In many cases, performance targets may be satisfied for the service contact groups served or affected by a skill group before the total costs are minimized for revenue channels. Penalty costs due to poor service will be added to $\Delta_{jht}$ for staffing shortages that would cause service levels below the service level targets for one or more service contact groups served or affected by the skill group. When shortages exist but the staffing levels are high enough to meet the service level targets but not to minimize the total costs, no penalty costs due to service level deterioration is added to $\Delta_{jht}$. In this cases, $\Delta_{jht}$ consists of the lost sales and communication costs.

In other cases, service level targets for service contact groups served or affected by a skill group may require higher staffing levels than the level needed to minimize the total costs for the revenue contact groups. In this case, a penalty cost is added to $\Delta_{jht}$ for all agent shortages.

Lost sales, communication and penalty costs are determined by the shortages from the required staffing levels, $b_{ht}$, in interval t on day h. That is, if a total of Z agents are scheduled for work in an interval and the required staffing level is b, $\Delta_{htj}$ includes the additional lost sales and communication costs and penalty costs when Z<b. It is calculated for a net staffing level of Z×(1−shrinkage) and π=b×(1−shrinkage). The net staff shortage compared to the required net staffing level of π is {π−Z×(1−shrinkage)}.

Staff shortages are enumerated from zero to $\pi_{jht}$ for each interval before (11-19) is formulated. For a staff shortage level, simulation is used to determine i) abandonment % for revenue contact groups, and ii) service levels for the service contact groups served and affected by the staffing level of the skill group considered. Using the sales ratios and permanently abandoned contacts measure, the lost sales and communication costs portion of $\Delta_{jht}$ for the staff shortage level is determined. Likewise, penalty costs for service contact groups served by or affected by the staffing shortages for the skill group which have service levels below their targets are calculated and added to $\Delta_{jht}$.

Although overages in an interval may further lower lost sales and communication costs, when agent costs are added, the net result is an increase in total costs in (11) since $b_{ht}$ is the required staffing level. To penalize agent overages, the reduction that may result in the total lost sales and communication costs due to overages is not included in (11). However, it should be clear to a person with ordinary skills in art that the objective function (11) can be extended to include these cost terms for overages.

The cost of assigning agents to weekly work patterns, and wages and benefits paid is determined by agent schedules specified by work pattern and shift variables. However, in order to exclude the unpaid portion of agent shrinkage (e.g. time off for some personal reasons), weekly costs, and wages and benefits paid are multiplied by $\alpha_k$ in (11). $\alpha_k$ includes the portion of shrinkage that is paid in addition to actual work time. Thus, the objective function includes the cost of scheduled agents without unpaid portion of shrinkage.

In one embodiment of the invention, formulation (11-19) is solved using a software program applying the well known branch and bound algorithm (Wolsey, 1998) used for MILP models. In another embodiment, the branch and bound algorithm may be supplemented by a rounding algorithm. For example, application of a rounding algorithm together a branch and bound algorithm is discussed in U.S. patent application Ser. No. 12/584,210 to accelerate the time to an integer solution.

In yet another embodiment, a heuristic approach based on some rules may be used. For example, a construction, interchange or simulated annealing, tabu search from the field of Operations Research may be applied in addition to all other known general purpose heuristic approaches for MILP models including a Monte Carlo method. Application of these and other solution methodologies are also within the scope of the present invention.

The computer implemented system of the invention for staffing and scheduling agents for revenue and service channels consist of a staffing and scheduling system 150 and its database 140, and a connection with the computer network to communicate with the other computers in use.

The staffing and scheduling system 150 consists of a computer executable code that applies the steps of the method of the invention to generate agent schedules for the NCO, AHT, shrinkage, and sales ratio forecasts received from the forecasting system 120. It generates initial staffing levels for each skill group. With the initial staffing levels, it generates the coefficients and equations of the MILP formulation (11-19), solves it to determine optimal or near optimal values for the variables used in formulate (11-19), and generates optimal or near optimal agent schedules with work and off days, daily start and end times and daily break times. In the iterative step, it unschedules agents in one skill group while keeping agents in other skill groups on their current schedules, simulates contact arrival and handling, and determines performance measures to update staffing levels for the skill group unscheduled. After finding the updated staffing levels using a subgradient search algorithm, it reschedules the agents in the skill group. In each iteration, all skill groups are unscheduled, simulated and rescheduled, one at a time. Final schedules are obtained when one or more of stopping rules specified are met. A computer executable code is thus understood to be a software implementation of staffing and agent scheduling method of the invention which can be installed on a computer system. Also, the computer executable code provide interface with other software systems including the database management software to store and retrieve data, forecasts, performance targets and other needed information.

The computer executable code reside on a computer system with at least one processor, random access memory, disk storage device, bus connection between these components, operating system. The computer network 100 enables the staffing and scheduling system of the invention to receive forecasts from the forecasting system 130.

The method and computer system of the present invention are described herein as part of the preferred embodiment. However, the examples and descriptions provided are only for illustrative purpose and do not restrict in any way the scope and the applications of the method or use of computer system of the invention in other settings. For example, the method and system of the invention can be used for staffing and scheduling in non-skills based routing environments where each skill group has one or more contact groups served exclusively by itself. Likewise, the software and computer embodiments are only exemplary. For example, the method of the invention can also be implemented in some other software using that software's functionality (e.g. a spreadsheet software that can solve an MILP formulation). The software architecture may also be a client-server type or web-based. A person with ordinary skills in the art will appreciate that many variations of the method and computer system of the invention and their use in different systems are possible, and within the scope of the invention.

Having thus described my invention, what I claim as new and desire to secure by Letters Patents is as follows:

1. A computer implemented method comprising:
performing, by a computer, the steps of:
    (a) acquiring a planning period, revenue contact groups, service contact groups, and contact volume and average service time forecasts for the revenue contact groups and the service contact groups served over the planning period;
    (b) acquiring skill groups including a plurality of agents and agent skills, and scheduling rules for the plurality of agents;
    (c) acquiring revenue-based targets for the revenue contact groups and productivity-based targets for the service contact groups acquired in step (a);
    (d) acquiring agent schedule costs, lost sales, and communication and facility costs that contribute to total schedule costs;
    (e) acquiring initial current schedules for the plurality of agents acquired in step (b) over the planning period;
    (f) selecting one of the skill groups acquired in step (b);
    (g) un-scheduling the plurality of agents in the one skill group selected in step (f) by discarding the initial current schedules while keeping the plurality of agents in other skill groups on the initial current schedules;
    (h) updating the required staffing levels for the one skill group selected in step (f), while the plurality of agents in other skill groups are kept on the initial current schedules, to meet as close as possible the productivity-based targets for the service contact groups, and the revenue-based targets for the revenue contact groups affected by staffing levels of the skill group selected in step (f);
    (i) generating updated current schedules for the plurality of agents in the one skill group selected in step (f) so that the number of the plurality of agents scheduled most closely meet the updated required staffing levels found in step (h) while minimizing the total schedule costs;
    (j) repeating steps (f-i) until each skill group of the skill groups are selected and updated;
    (k) repeating steps (f-j) with each execution of these steps being an iteration, until one or more of stopping conditions are satisfied.

2. The computer implemented method of claim 1, wherein one or more staffing models are used to determine the required staffing levels for the one skill group, and expected performance levels and customer contact abandonments for the revenue contact groups and the service contact groups over the planning period.

3. The computer implemented method of claim 1, wherein the required staffing levels for the one skill group are determined while the plurality of agents in the each skill group of the skill groups are kept on their current schedules as the staffing levels, minimizing the total schedule costs over the planning period for the revenue contact groups, and meeting the productivity-based targets for the service contact groups.

4. A non-transitory computer readable medium including a computer program stored thereon when executed by a computer performs the steps comprising:
    (a) acquiring a planning period, revenue contact groups, service contact groups, and contact volume and average service time forecasts for the revenue contact groups and the service contact groups served over the planning period;
    (b) acquiring skill groups including a plurality of agents and agent skills, and scheduling rules for the plurality of agents;
    (c) acquiring revenue-based targets for the revenue contact groups and productivity-based targets for the service contact groups acquired in step (a);
    (d) acquiring agent schedule costs, lost sales, and communication and facility costs that contribute to total schedule costs;
    (e) acquiring initial current schedules for the plurality of agents acquired in step (b) over the planning period;
    (f) selecting one of the skill groups acquired in step (b);
    (g) un-scheduling the plurality of agents in the one skill group selected in step (f) by discarding the initial current schedules while keeping the plurality of agents in other skill groups on the initial current schedules;
    (h) updating the required staffing levels for the one skill group selected in step (f), while the plurality of agents in other skill groups are kept on the initial current schedules, to meet as close as possible the productivity-based targets for the service contact groups, and the revenue-based targets for the revenue contact groups affected by staffing levels of the skill group selected in step (f);

(i) generating updated current schedules for the plurality of agents in the one skill group selected in step (f) so that the number of the plurality of agents scheduled most closely meet the updated required staffing levels found in step (h) while minimizing the total schedule costs;
(j) repeating steps (f-i) until each skill group of the skill groups are selected and updated;
(k) repeating steps (f-j) with each execution of these steps being an iteration, until one or more of stopping conditions are satisfied.

* * * * *